United States Patent
Miyazaki et al.

(10) Patent No.: US 12,038,451 B2
(45) Date of Patent: Jul. 16, 2024

(54) PLATE TRANSPORT DEVICE AND PLATE CHANGER

(71) Applicant: SHIMADZU CORPORATION, Kyoto (JP)

(72) Inventors: Koki Miyazaki, Kyoto (JP); Tadanobu Shibabuki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 670 days.

(21) Appl. No.: 17/266,139

(22) PCT Filed: Aug. 23, 2018

(86) PCT No.: PCT/JP2018/031187
§ 371 (c)(1),
(2) Date: Feb. 5, 2021

(87) PCT Pub. No.: WO2020/039558
PCT Pub. Date: Feb. 27, 2020

(65) Prior Publication Data
US 2021/0293840 A1    Sep. 23, 2021

(51) Int. Cl.
*G01N 35/04* (2006.01)
*B25J 15/08* (2006.01)
(Continued)

(52) U.S. Cl.
CPC .............. *G01N 35/04* (2013.01); *B25J 15/08* (2013.01); *G01N 35/0099* (2013.01);
(Continued)

(58) Field of Classification Search
None
See application file for complete search history.

(56) References Cited

U.S. PATENT DOCUMENTS 5,201,501 A * 4/1993 Fassler ................ B24B 13/0031
294/902
5,810,935 A * 9/1998 Lee .................... H01L 21/68707
118/500
(Continued)

FOREIGN PATENT DOCUMENTS

CN  102126213 A   7/2011
JP  09-089904 A   4/1997
(Continued)

OTHER PUBLICATIONS

International Search Report for corresponding Application No. PCT/JP2018/031187, mailed Oct. 16, 2018.
(Continued)

*Primary Examiner* — P. Kathryn Wright
(74) *Attorney, Agent, or Firm* — Renner, Otto, Boisselle & Sklar, LLP

(57) ABSTRACT

A plate transport device includes a main body, first and second moving members and first and second elastic members. The main body has an intermediate supporter. The first and second moving members have first and second supporters, respectively. The first and second moving members are supported to be movable in a first direction with respect to the main body. The first elastic member is provided between the intermediate supporter and the first supporter, and supplies a first biasing force directed toward the intermediate supporter in the first direction to the first moving member. The second elastic member is provided between the intermediate supporter and the second supporter, and supplies a second biasing force, which is directed toward the intermediate supporter in the first direction and opposite to the direction in which the first biasing force is directed, to the second moving member.

6 Claims, 12 Drawing Sheets

(51) Int. Cl.
*G01N 35/00* (2006.01)
*B25J 15/00* (2006.01)
*B25J 15/06* (2006.01)

(52) U.S. Cl.
CPC ............ *B25J 15/00* (2013.01); *B25J 15/0666* (2013.01); *G01N 2035/0418* (2013.01); *G01N 2035/042* (2013.01); *G01N 2035/0425* (2013.01)

(56) References Cited

U.S. PATENT DOCUMENTS 6,322,312 B1 * 11/2001 Sundar ................. B25J 15/0206
                                                        414/744.5
9,352,471 B1 * 5/2016 Velazquez ............ B25J 15/0028

FOREIGN PATENT DOCUMENTS

JP      2004-314199 A    11/2004
JP      2006-189362 A    7/2006
WO   WO-2005102617 A1 * 11/2005 ................ B01L 9/50

OTHER PUBLICATIONS

Written Opinion for corresponding Application No. PCT/JP2018/031187, mailed Oct. 16, 2018 (English translation).
Office Action in corresponding Chinese Patent Application No. 201880096114.7 dated Nov. 1, 2023, with English machine translation.
Decision of Refusal in corresponding Chinese Patent Application No. 201880096114.7 dated May 9, 2024, with English machine translation.

* cited by examiner

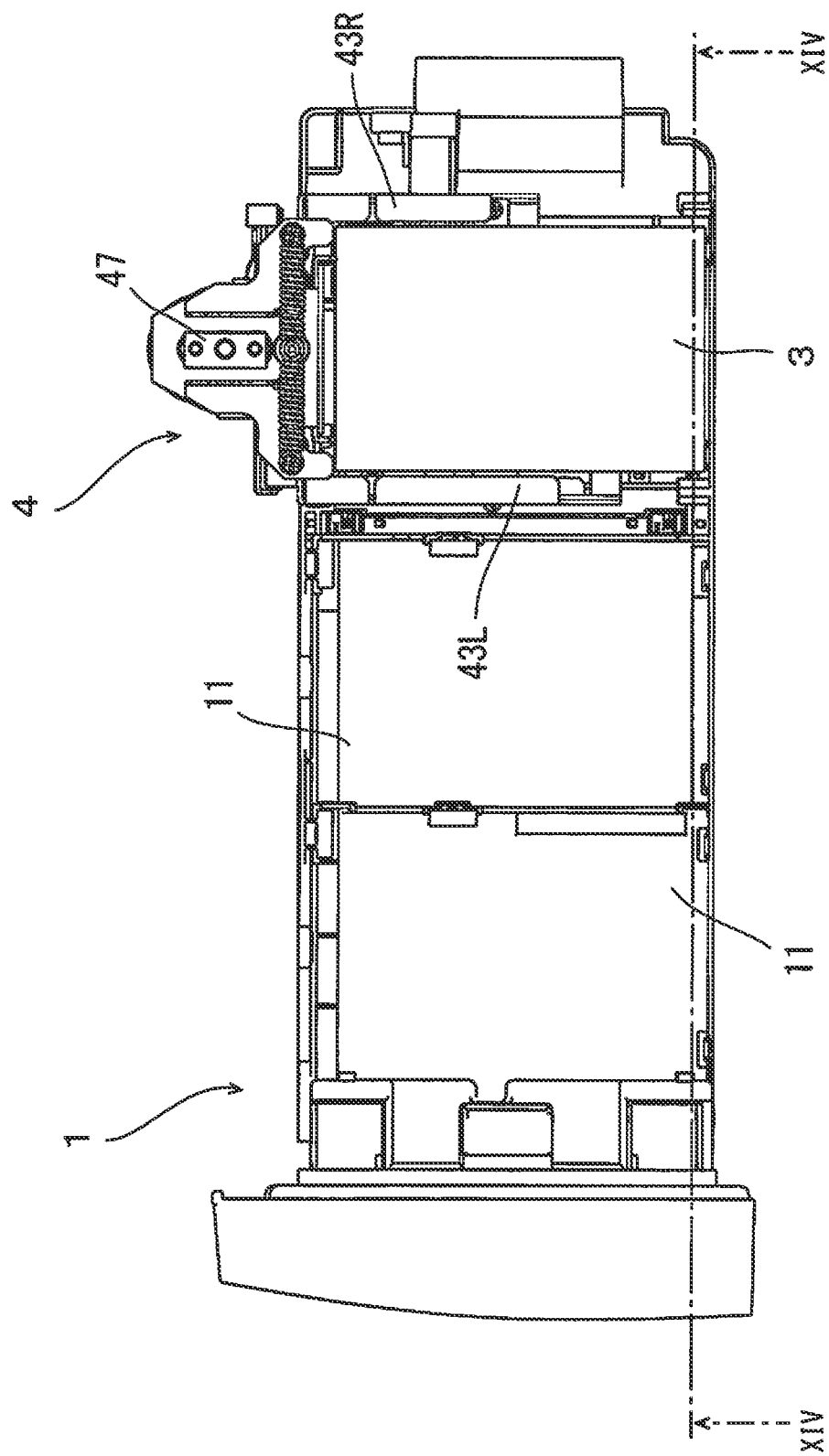

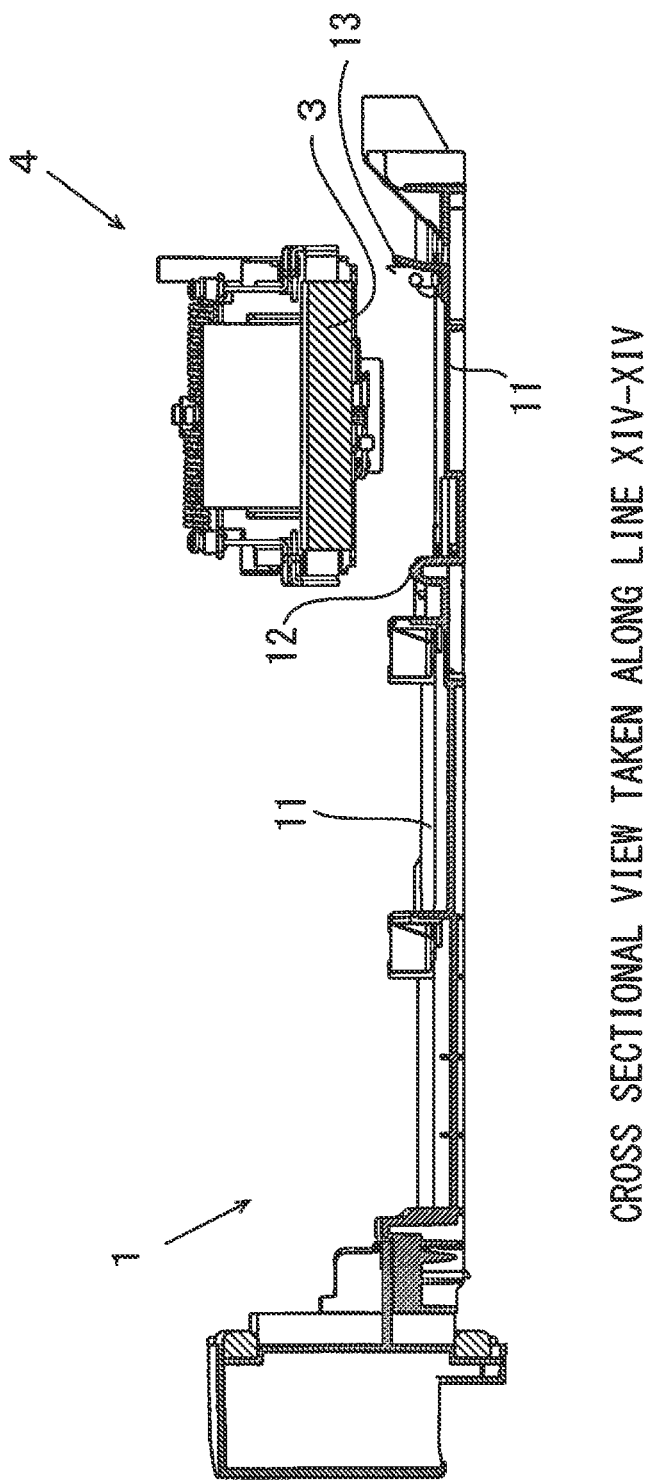

PLATE TRANSPORT DEVICE AND PLATE CHANGER

TECHNICAL FIELD

The present invention relates to a plate transport device used in a plate changer that supplies a plate to an autosampler, and the plate changer including the plate transport device.

BACKGROUND ART

There is an autosampler that automatically injects a sample to be analyzed to an analysis device such as a high-performance liquid chromatograph. Further, there is a plate changer that supplies a plate to an autosampler. The plate changer has a plate storage in which a plurality of sample plates (hereinafter abbreviated as plates) are housed. In the plates, a plurality of vials into which a sample to be analyzed is injected are housed. Further, the plate changer has a plate transport device that transports a plate between the plate storage and the autosampler.

In a conventional plate changer, a dedicated plate is used as a plate. A projection is provided on the plate transport device. The projection is engaged with a hole provided in the dedicated plate, so that the plate transport device holds the dedicated plate. Therefore, it is necessary to design the position and shape of the projection of the plate transport device in accordance with the position and shape of the hole of the dedicated plate. The position and shape of the projection of the plate transport device are required to be highly accurate in order for the dedicated plate to be held reliably. Further, high accuracy is also required in regard to the control of the plate transport device for holding the dedicated plate.

The below-mentioned Patent Document 1 relates to a container transport device for transporting a rack (plate) housing a sample container to a sample automatic injection device (autosampler). In Patent Document 1, an engaging portion is provided at the tip surface of a container holding mechanism which is the container transport device. The engaging portion is inserted into a hole provided in a side surface of the rack, whereby the container holding mechanism holds the rack.

[Patent Document 1] JP 2006-189362 A

SUMMARY OF INVENTION

Technical Problem

Since the above-mentioned conventional plate changer has the structure for engaging with a plate using the projection provided on the plate transport device, it is necessary to use a dedicated plate. Therefore, in a case where the specification of the plate changer differs, it is necessary to use a plate that is in accordance with the specification.

Further, since the projection of the plate transport device must be manufactured with high accuracy in accordance with the position and shape of the hole of the dedicated plate, the manufacturing cost is increased. Further, accurate position adjustment is also required in the step of assembling the plate changer including the plate transport device.

An object of the present invention is to increase a degree of flexibility of a shape of a sample plate in a plate transport device used in a plate changer that supplies the sample plate to an autosampler and to reduce a manufacturing cost for the plate transport device.

Solution to Problem (1) A plate transport device according to one aspect of the present invention supplies a sample plate to an autosampler and is used in a plate changer, and includes a main body having an intermediate supporter, a first moving member that has a first supporter and is supported to be movable in a first direction with respect to the main body, a second moving member having a second supporter and is supported to be movable in the first direction with respect to the main body, a first elastic member that is provided between the intermediate supporter and the first supporter and supplies a first biasing force directed toward the intermediate supporter in the first direction to the first moving member, and a second elastic member that is provided between the intermediate supporter and the second supporter and supplies a second biasing force, which is directed toward the intermediate supporter in the first direction and opposite to a direction in which the first biasing force is directed, to the second moving member, wherein the sample plate is held between the first moving member and the second moving member by supply of a biasing force directed toward the second moving member to the first moving member by the first biasing force and supply of a biasing force directed toward the first moving member to the second moving member by the second biasing force.

This plate transport device utilizes the biasing forces of the first elastic member and the second elastic member and holds the plate between the first moving member and the second moving member. Thus, it is not necessary to use a dedicated plate as a plate used by the plate transport device. Because the plate transport device can hold plates having various shapes and sizes, different types of plates can also be used.

It is not necessary for the plate transport device to have a projection that coincides with the hole provided in the dedicated plate as conventionally done. Because it is not necessary for the plate transport device to have a projection, the manufacturing cost for the plate transport device is reduced, and the accurate position adjustment is not necessary in a step of assembling the plate changer.

Further, because this plate transport device utilizes the biasing forces of the first elastic member and the second elastic member and supports the first moving member and the second moving member, the first moving member and the second moving member are movable in the first direction while holding the plate. When the plate is placed on the autosampler, in a case where a guide is provided at the autosampler, it is possible to place the plate at a predetermined position in the autosampler while adjusting the holding position of the plate in the first direction.

(2) The plate transport device may further include an adjustment mechanism that adjusts a position of the intermediate supporter in the first direction.

Even in a case where a difference is generated between the biasing forces of the first elastic member and the second elastic member, the adjustment mechanism can cause the center position between the first moving member and the second moving member in the first direction to coincide with the center position of the plate transport device in the first direction. Thus, when the plate transport device holds the plate, because the center position of the plate in the first direction coincides with the center position of the plate transport device in the first direction, the plate transport device can hold the plate at its center position in the first direction.

(3) The plate transport device may further include a rotation member that is supported at the main body to be rotatable. The rotation member may be arranged between the first moving member and the second moving member in the first direction and may press each of the first moving member and the second moving member in a direction away from the intermediate supporter when the rotation member rotates to be in a pressing position.

The plate transport device can start an operation of holding the plate by rotating the rotation member to the pressing position. Further, the plate transport device can release the holding state of the plate by rotating the rotation member to the pressing position.

(4) The first moving member may include a first arm member extending in a second direction that intersects with the first direction, the second moving member may include a second arm member extending in a third direction that intersects with the first direction, and first and second plate supporters that come into contact with the sample plate may be provided at the first arm member to be spaced apart from each other in the second direction, and a third plate supporter that comes into contact with the sample plate may be provided at the second arm member.

Because the plate transport device has a configuration in which the plate is held by the first to third plate supporters, the number of components is reduced. Further, the manufacturing cost for the plate transport device is reduced.

(5) Each of the first, second and third plate supporters may include a hollow member extending in the first direction.

Even in a case where the plate is held by part of the cross section of the plate supporter, because the plate can be held by a circumferential portion of the plate supporter, the holding state of the plate is good.

(6) A length of the first arm in the second direction may be configured to be larger than a length of the second arm in the third direction.

Because the length of the second arm can be shortened, the manufacturing cost is reduced.

(7) A plate changer according to another aspect of the present invention is used for an autosampler, and includes a plate storage that stores one or more sample plates and the above-mentioned plate transport device that transports a sample plate between the plate storage and the autosampler.

Advantageous Effects of Invention

The plate transport device of the present invention can increase the degree of flexibility of the shape of a sample plate to be used in the plate changer. Further, the plate transport device of the present invention can reduce the manufacturing cost for the plate transport device.

BRIEF DESCRIPTION OF THE DRAWINGS

FIG. 13 is a plan view showing the plate transport device that has moved to the autosampler while holding the plate.

FIG. 14 is a cross sectional view taken along the line XIV-XIV of FIG. 13.

DESCRIPTION OF EMBODIMENTS (1) Overall Configuration and Operation of Plate Changer FIG. 1 is a schematic plan view of an autosampler 1 and a plate changer 2 according to the present embodiment. In FIGS. 1 to 3, arrows indicating an X direction, a Y direction and a Z direction, which are orthogonal to one another, are depicted in order to clarify positional relationships. The X direction and the Y direction are orthogonal to each other within a horizontal plane, and the Z direction corresponds to an up-and-down direction. The plate changer 2 is provided at a side portion of the autosampler 1 as a device attached to the autosampler 1.

Figure 1:
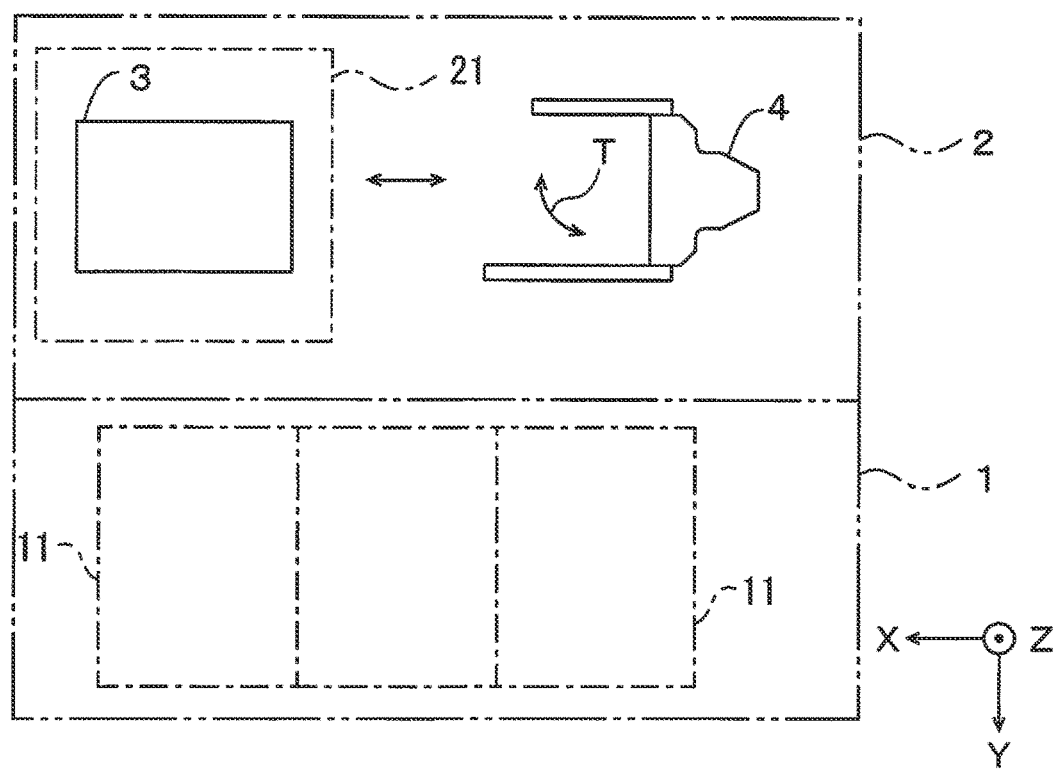
FIG. 1 is a schematic plan view of an autosampler and a plate changer according to the present embodiment.

In the present embodiment, the autosampler 1 is a device that automatically injects a sample to be analyzed to a high-performance liquid chromatograph (not shown). The plate changer 2 is a device that stores a sample plate (hereinafter abbreviated as a plate) 3 housing a plurality of vials that house a sample to be analyzed. The plate changer 2 includes a plate storage 21 and a plate transport device 4. The plate storage 21 stores a plurality of plates 3. The plate transport device 4 takes out a plate 3 housed in the plate storage 21 and supplies the held plate 3 to the autosampler 1.

The autosampler 1 includes a plurality of plate holders 11 on which the plates 3 are to be placed. Although the plate holders 11 are provided at a plurality of locations (three locations in the present example) as shown in FIG. 1, a plate holder 11 located at the rightmost position in FIG. 1 is used as a plate holder 11 on which a plate 3 transported by the plate transport device 4 is to be placed. Although not shown, the autosampler 1 has a mechanism and a controller for injecting a sample to be analyzed to a high-performance liquid chromatograph. The mechanism and controller extract a sample from a vial housed in the plate 3 placed on the plate holder 11 and automatically injects the sample to the high-performance liquid chromatograph.

Figure 2:
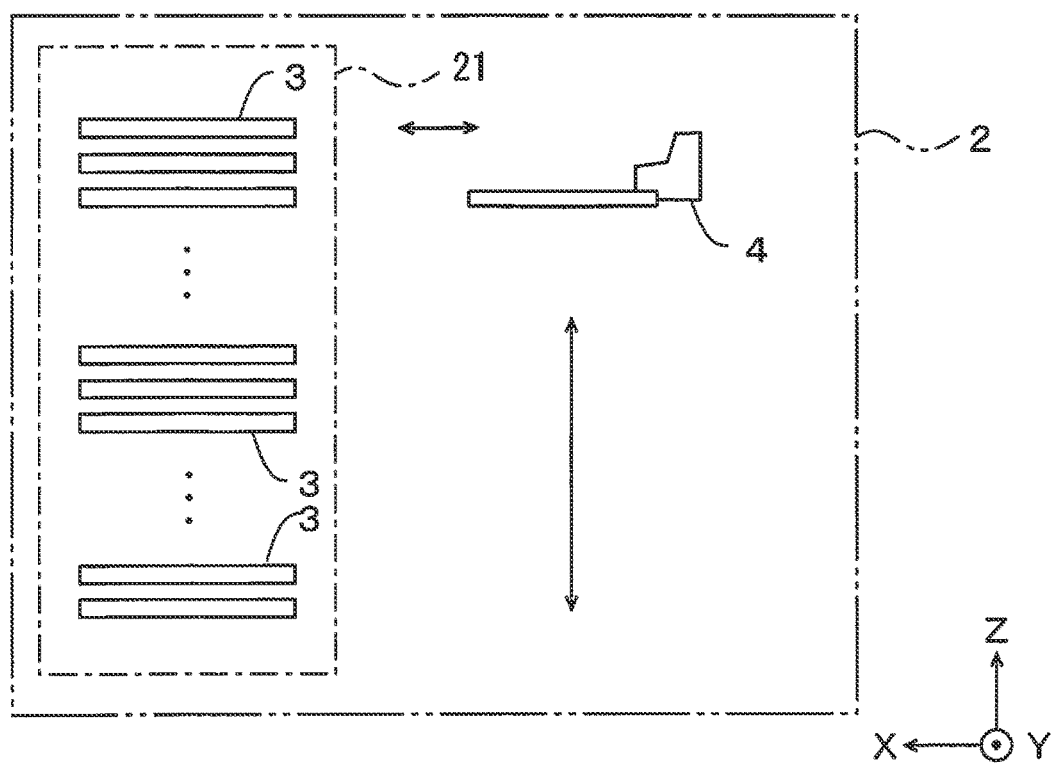
FIG. 2 is a schematic side view of the plate changer according to the present embodiment.

FIG. 2 is a schematic side view of the plate changer 2 according to the present embodiment. In the plate storage 21, the plurality of plates 3 are arranged in the Z direction. A vial into which a sample to be analyzed is injected is housed in each plate 3. For example, 35 vials are housed and arranged in 5 rows by 7 columns in one plate 3. While being arranged in the Z direction in the present embodiment, the plurality of plates 3 may be arranged in the X direction or the Y direction.

As shown in FIGS. 1 and 2, the plate transport device 4 is movable in the X direction. The plate transport device 4 holds one plate 3 arranged in the plate storage 21 by moving in the X direction. The plate transport device 4 holds the plate 3 in the plate storage 21 and then moves in the X direction and away from the plate storage 21.

Figure 3:
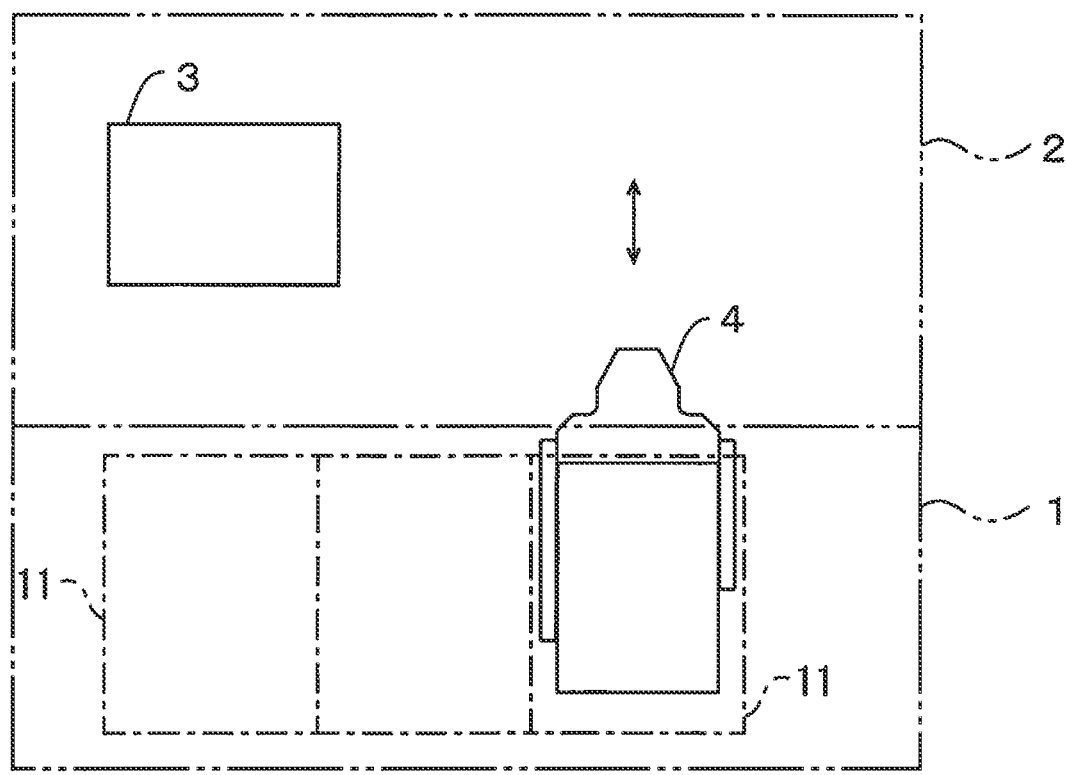
FIG. 3 is a schematic plan view showing a plate transport device that have moved into the autosampler.
Figure 3:
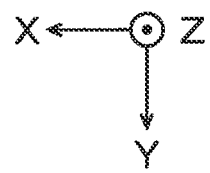

Next, as indicated by the arrow T in FIG. 1, the plate transport device 4 holding the plate 3 rotates within an XY plane by 90 degrees and changes its orientation toward the autosampler 1. Subsequently, as shown in FIG. 3, the plate transport device 4 advances in the Y direction and moves into a device of the autosampler 1. Then, the plate transport device 4 moves downwardly in the Z direction and places the plate 3 on a plate holder 11 provided in the autosampler 1.

After placing the plate 3 on the plate holder 11, the plate transport device 4 releases the plate 3. After releasing the plate 3, the plate transport device 4 moves into the plate changer 2. In the autosampler 1, when automatic injection of all of the samples that are housed in the plate 3 and are to be analyzed is completed, the plate transport device 4 moves toward the plate 3 placed on the plate holder 11 again and holds the plate 3. The plate transport device 4 returns to the plate changer 2 while holding the plate 3 and returns the plate 3 back to the original position in the plate storage 21.

(2) Configuration of Plate Transport Device

Figure 4:
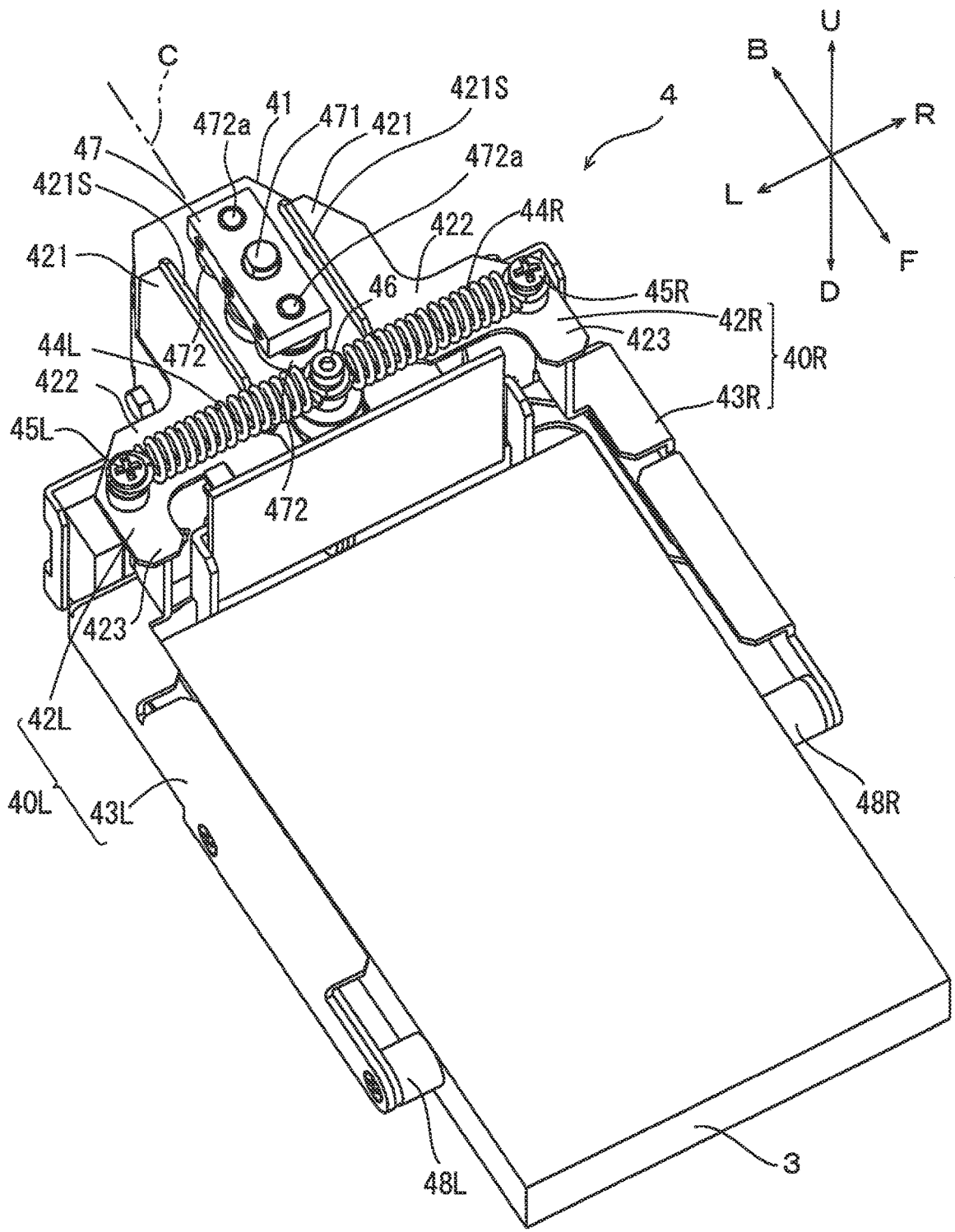
FIG. 4 is a perspective view of the plate transport device according to the present embodiment.

FIG. 4 is a perspective view of the plate transport device 4 according to the present embodiment. The plate transport device 4 includes a main body 41 and left and right sliding members 42L, 42R attached to the main body 41. The left and right sliding members 42L, 42R are movable in the left-and-right direction (the direction of the arrow L-R) of the diagram with respect to the main body 41. The left-and-right direction of the plate transport device 4 is changeable since the plate transport device 4 is rotatable within the XY plane shown in FIG. 1. However, in the subsequent diagrams, the direction of the arrow L-R shown in the diagram is described as the left-and-right direction of the plate transport device 4 for the sake of explanation, and the direction of the arrow F-B shown in the diagram is described as the front-and-rear direction of the plate transport device 4 for the sake of explanation. Further, the direction of the arrow U-D shown in the diagram is described as the up-and-down direction of the plate transport device 4 for the sake of explanation. The left-and-right direction (the direction of the arrow L-R) and the front-and-rear direction (the direction of the arrow F-B) are the directions within the XY plane shown in FIG. 1 and the other diagrams. The up-and-down direction (the direction of the arrow U-D) coincides with the Z direction in FIG. 1 and the other diagrams.

Left and right sliding members 42L, 42R include first portions 421, 421 extending substantially in the front-and-rear direction. The right edge of the first portion 421 of the left sliding member 42L forms a bending stopper 421S. The left edge of the first portion 421 of the right sliding member 42R forms a bending stopper 421S. The front ends of the first portions 421, 421 are connected to second portions 422, 422. The second portions 422, 422 extend substantially in the left-and-right direction. The end portions, opposite to the end portions of the second portions 422, 422 to which the first portions 421, 421 are connected, are connected to third portions 423, 423. The third portions 423, 423 extend substantially in the front-and-rear direction. The first portion 421, the second portion 422 and the third portion 423 are integrally formed in each of the left and right sliding members 42L, 42R.

In the left and right sliding members 42L, 42R, left and right arm members 43L, 43R are attached to lower portions of the third portions 423, 423, respectively. Thus, when the left and right sliding members 42L, 42R slide in the left-and-right direction with respect to the main body 41, the left and right arm members 43L, 43R also slide in the left-and-right direction together with the left and right sliding members 42L, 42R. A moving member including the left sliding member 42L and the left arm member 43L is referred to as a left moving member 40L. A moving member including the right sliding member 42R and the right arm member 43R is referred to as a right moving member 40R.

A screw 45L is attached to the third portion 423 of the left sliding member 42L. A screw 45R is attached to the third portion 423 of the right sliding member 42R. A screw 46 is attached to the main body 41. A spring 44L is provided between the screw 45L and the screw 46. The spring 44L supplies a force directed toward the center of the main body 41 (the force directed in the rightward direction) in the left-and-right direction with respect to the left sliding member 42L. A spring 44R is provided between the screw 45R and the screw 46. The spring 44R supplies a force directed toward the center of the main body 41 (the force directed in the leftward direction) in the left-and-right direction with respect to the right sliding member 42R.

A rotation plate 47 supported by a rotation shaft 471 is provided at the main body 41. The rotation plate 47 is a member having a substantially cuboid shape. The rotation plate 47 is rotatable together with the rotation shaft 471 within the plane including the left-and-right direction and the front-and-rear direction of the plate transport device 4. In other words, the rotation plate 47 is rotatable together with the rotation shaft 471 within the XY plane in FIG. 1. The rotation shaft 471 is connected to a drive source (not shown) arranged inside of the main body 41. The rotation shaft 471 is driven to be rotated in response to a control signal transmitted from the controller (not shown) of the plate changer 2.

Roll members 472, 472 are respectively provided in lower portions at both ends of the rotation plate 47 in a longitudinal direction. The roll members 472, 472 are rotatable about rotation shafts 472a, 472a. The roll members 472, 472 do not include a rotation drive source. As described below, the side surfaces of the roll members 472 come into contact with the stoppers 421S, 421S, so that the roll members 472, 472 are rotated passively.

Figure 5:
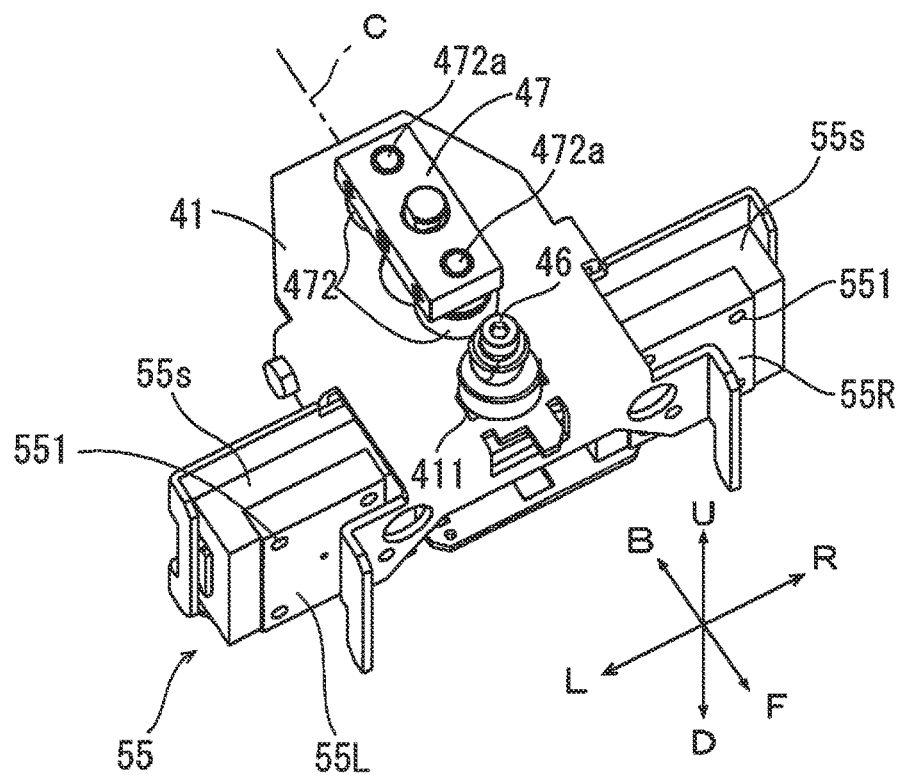
FIG. 5 is a perspective view of a main body of the plate transport device.
Figure 6:
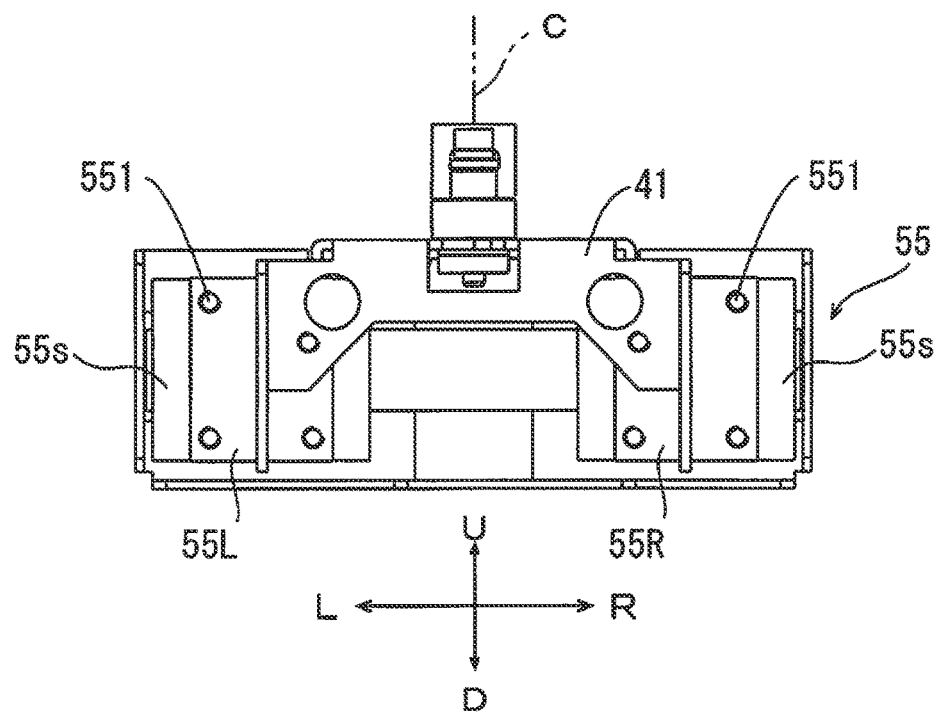
FIG. 6 is a front view of the main body of the plate transport device.

FIG. 5 is a perspective view of the main body 41. FIG. 6 is a front view of the main body 41. In FIGS. 5 and 6, the left and right sliding members 42L, 42R and the left and right arm members 43L, 43R are detached from the main body 41. The main body 41 includes a linear guide 55. The linear guide 55 includes a linear slide 55S and left and right linear blocks 55L, 55R. The left and right linear blocks 55L, 55R are slidable in the left-and-right direction (the direction of the arrow L-R) independently and respectively with respect to the linear slide 55S.

Figure 7:
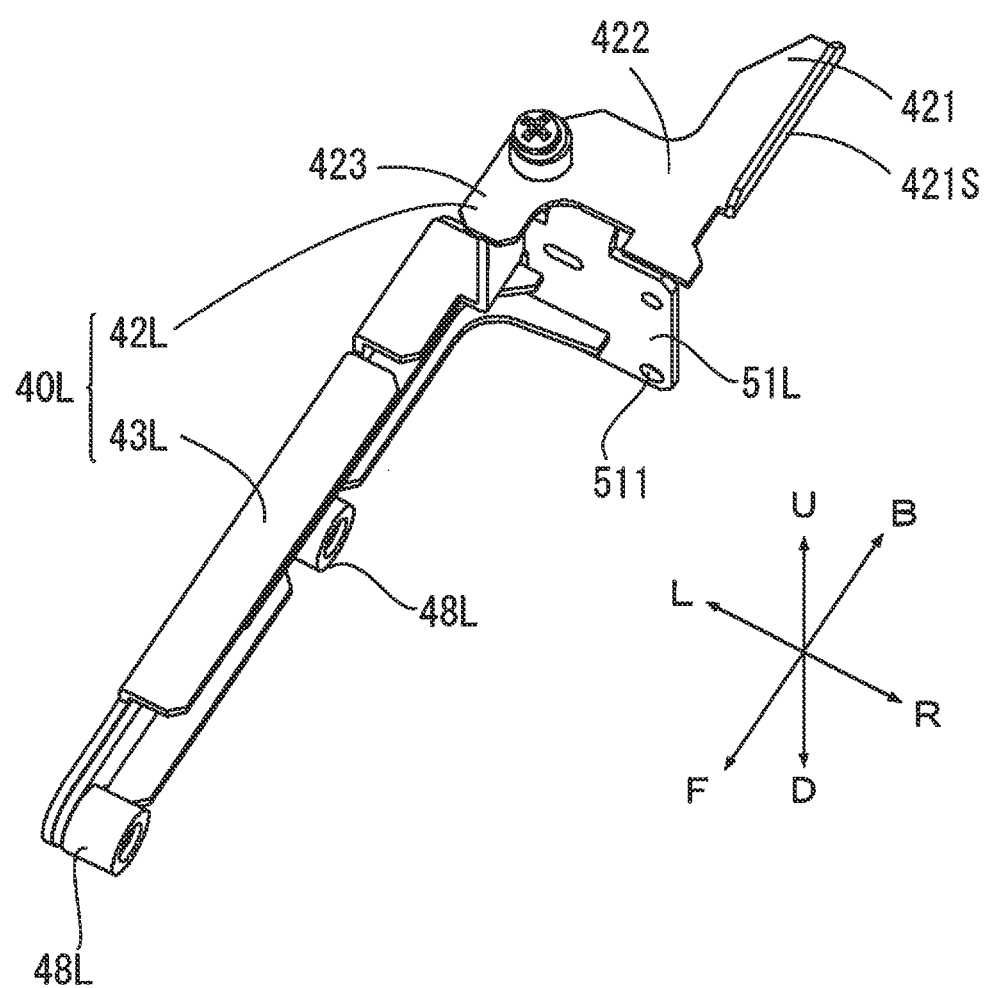
FIG. 7 is a perspective view of a left moving member, including a left sliding member and a left arm member, of the plate transport device.

FIG. 7 is a perspective view of the left sliding member 42L and the left arm member 43L. A connection plate 51L is fixed to a lower portion of the left sliding member 42L. The connection plate 51L is also fixed to the rear end of the left arm member 43L. A plurality of screw holes 511 are provided in the connection plate 51L.

Figure 8:
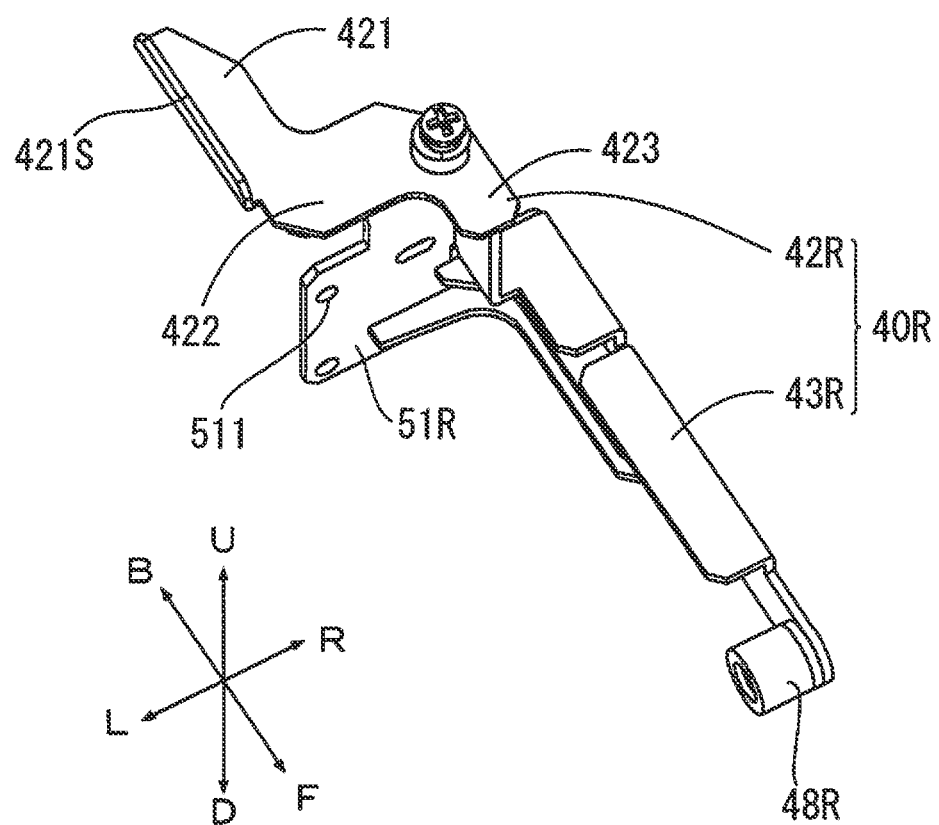
FIG. 8 is a perspective view of a right moving member, including a right sliding member and a right arm member, of the plate transport device.

FIG. 8 is a perspective view of the right sliding member 42R and the right arm member 43R. A connection plate 51R is fixed to a lower portion of the right sliding member 42R. The connection plate 51R is fixed to the rear end of the right arm member 43R. A plurality of screw holes 511 are provided in the connection plate 51R.

Reference is made again to the FIGS. 5 and 6. A plurality of screw holes 551 are provided in each of the left and right linear blocks 55L, 55R. Screws (not shown) are inserted into the screw holes 551 provided in the left linear block 55L and the screw holes 511 provided in the connection plate 51L and fastened, whereby the connection plate 51L is fixed to the left linear block 55L. Thus, the left sliding member 42L and the left arm member 43L are fixed to the left linear block 55L via the connection plate 51L.

Similarly, screws (not shown) are inserted into the screw holes 551 provided in the right linear block 55R and the screw holes 511 provided in the connection plate 51R and fastened, whereby the connection plate 51R is fixed to the right linear block 55R. Thus, the right sliding member 42R and the right arm member 43R are fixed to the right linear block 55R via the connection plate 51R.

With the above-mentioned configuration, the left sliding member 42L and the left arm member 43L are fixed to the left linear block 55L, and the right sliding member 42R and the right arm member 43R are fixed to the right linear block 55R. Then, the left linear block 55L slides leftwardly and rightwardly with respect to the linear slide 55S, whereby the left sliding member 42L and the left arm member 43L slide together leftwardly and rightwardly. The right linear block 55R slides leftwardly and rightwardly with respect to the linear slide 55S, whereby the right sliding member 42R and the right arm member 43R slide together leftwardly and rightwardly.

A bearing (not shown) is embedded in a contact portion between the linear slide 55S and the left and right linear blocks 55L, 55R. Thus, when an external force is applied to the left and right sliding members 42L, 42R or the left and right arm members 43L, 43R, the left and right sliding members 42L, 42R and the left and right arm members 43L, 43R can move smoothly in the left-and-right direction together with the left and right linear blocks 55L, 55R.

As described above with reference to FIG. 4, the spring 44L supplies a force directed toward the center of the main body 41 (the force directed in the rightward direction) in the left-and-right direction to the left sliding member 42L. The spring 44R supplies a force directed toward the center of the main body 41 (the force directed in the leftward direction) in the left-and-right direction to the right sliding member 42R. Therefore, the left sliding member 42L and the left arm member 43L receive a force directed toward the center of the main body 41 (the force directed in the rightward direction). The right sliding member 42R and the right arm member 43R receive a force directed toward the center of the main body 41 (the force directed in the leftward direction).

As described above, the stopper 421S is formed at the right edge of the first portion 421 of the left sliding member 42L. The stopper 421S is formed at the left edge of the first portion 421 of the right sliding member 42R. When the left sliding member 42L and the left arm member 43L move in the rightward direction by the force of the spring 44, the stopper 421S of the left sliding member 42L comes into contact with the roll member 472 provided at the rotation plate 47. The stopper 421S of the left sliding member 42L comes into contact with the left side surface of the roll member 472, whereby a maximum movement position of the left sliding member 42L in the rightward direction is determined.

When the right sliding member 42R and the right arm member 43R move in the leftward direction by the force of the spring 44R, the stopper 421S of the right sliding member 42R comes into contact with the roll member 472 provided at the rotation plate 47. The stopper 421S of the right sliding member 42R comes into contact with the right side surface of the roll member 472, whereby a maximum movement position of the right sliding member 42R in the leftward direction is determined.

With the above-descried configuration, in a case where an external force is not applied, the left moving member 40L having the left sliding member 42L and the left arm member 43L move in the rightward direction by the biasing force of the spring 44L. Then, the left moving member 40L is restricted to move in the rightward direction at the position when the stopper 421S of the left sliding member 42L comes into contact with the roll member 472. Further, in a case where an external force is not applied, the right moving member 40R having the right sliding member 42R and the right arm member 43R move in the leftward direction by the biasing force of the spring 44R. Then, the right moving member 40R is restricted to move in the leftward direction at the position when the stopper 421S of the right sliding member 42R comes into contact with the roll member 472.

Further, when an external force is applied, the left moving member 40L having the left sliding member 42L and the left arm member 43L move in the leftward direction against the biasing force of the spring 44L. Further, the right moving member 40R having the right sliding member 42R and the right arm member 43R move in the rightward direction against the biasing force of the spring 44R.

(3) Center Position Adjustment Mechanism

With the left and right arm members 43L, 43R not holding the plate 3, the center position between the left arm member 43L and the right arm member 43R in the left-and-right direction desirably coincides with the center position C (see FIG. 4 to FIG. 6) of the main body 41 in the left-and-right direction. Alternatively, when the left and right arm members 43L, 43R are holding the plate 3, and the left and right arm members 43L, 43R or the left and right sliding members 42L, 42R are not receiving an external force, the center position between the left arm member 43L and the right arm member 43R in the left-and-right direction desirably coincides with the center position C of the main body 41 in the left-and-right direction. The plate transport device 4 of the present embodiment includes a mechanism for adjusting the center position between the left arm member 43L and the right arm member 43R in the left-and-right direction.

As shown in FIG. 5, a screw hole 411 into which the screw 46 is inserted is an elongated hole extending in the left-and-right direction of the main body 41. The right end of the spring 44L and the left end of the spring 44R are fixed to the screw 46. Therefore, it is possible to move the position of the screw 46 in the left-and-right direction by loosening the screw 46. The position of the screw 46 in the left-and-right direction is adjusted, and the screw 46 is fastened at the adjusted position. Thus, the center position between the left arm member 43L and the right arm member 43R is adjusted.

Since same products are used as the spring 44L and the spring 44R, their elastic forces have close values. However, a difference in elastic force is generated due to individual differences of the products. Therefore, even in a case where the position of the screw 46 in the left-and-right direction coincides with the center position C of the main body 41 in the left-and-right direction, the center position between the left arm member 43L and the right arm member 43R in the left-and-right direction may not coincide with the center position C of the main body 41 in the left-and-right direction. As such, the position of the screw 46 in the left-and-right direction is adjusted such that the center position between the left arm member 43L and the right arm member 43R in the left-and-right direction coincides with the center position C of the main body 41 in the left-and-right direction.

In this manner, in the plate transport device 4 of the present embodiment, even in a case where a difference in biasing force of the springs 44L, 44R is generated, the adjustment mechanism having the screw 46 and the screw hole 411 can cause the center position between the left moving member 40L having the left sliding member 42L and the left arm member 43L, and the right moving member 40R having the right sliding member 42R and the right arm member 43R in the left-and-right direction to coincide with the center position of the plate transport device 4 in the left-and-right direction. Thus, when the plate transport device 4 holds the plate 3, the center position of the plate 3 in the left-and-right direction coincides with the center position of the plate transport device 4 in the left-and-right direction. Thus, the plate transport device 4 can hold the plate 3 at its center position in the left-and-right direction.

(4) Plate Supporter

As shown in FIG. 7, plate supporters 48L, 48L are provided at two locations in the left arm member 43L. One plate supporter 48L is provided near the front end of the left arm member 43L. The other plate supporter 48L is provided near the intermediate position of the left arm member 43L in the front-and-rear direction.

As shown in FIG. 8, a plate supporter 48R is provided at one location in the right arm member 43R. The plate supporter 48R is provided near the front end of the right arm member 43R.

Further, the plate 3 arranged between the left and right arm members 43L, 43R is held by the plate supporters 48L, 48L provided at the two locations in the left arm member 43L and the plate supporter 48R provided at the right arm member 43R.

Figure 9:
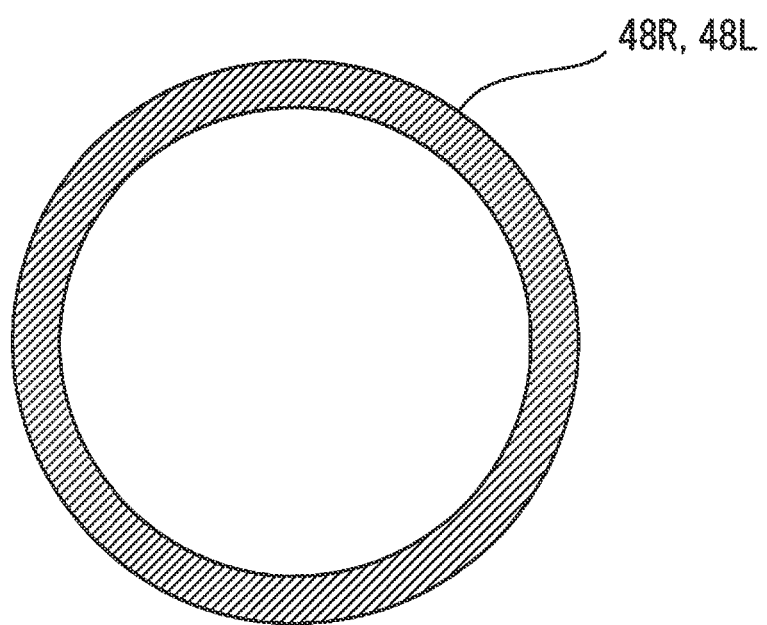
FIG. 9 is a cross sectional view of a plate supporter provided at each of the left and right arm members.

FIG. 9 is a cross sectional view of the plate supporter 48L and the plate supporter 48R as cut along the front-and-rear direction (the direction of the arrow F-R) of the plate transport device 4. As shown in FIG. 9, the plate supporter 48L and the plate supporter 48R have hollow cross sections. The plate supporter 48L and the plate supporter 48R are constituted by tubes made of resin such as polyethylene or polypropylene, or various types of rubber.

Because having hollow cross sections, the plate supporter 48L and the plate supporter 48R can hold the plate 3 by their circumferential portions. For example, even in a case where the plate 3 is held by part of the plate supporter 48L (48R) such as an upper half portion or a lower half portion of the plate supporter 48L (48R), the holding state of the plate 3 is improved by holding of the plate 3 by its circumferential portion. If the plate supporter 48L (48R) is a cylindrical member without a hollow, variations in contact area with the plate 3 may be generated due to irregularities of the cylindrical cross section. In the present embodiment, since the cross section of the plate supporter 48L (48R) has a hollow, the holding state of the plate 3 is improved.

Further, the plate transport device of the present embodiment has the configuration in which the plate 3 is held by the plate supporters 48L, 48L, 48R provided at three locations. Although plate supporters may be provided at four locations in the left-and-right direction, the plate 3 can be held by the plate supporters provided at three locations in the left-and-right direction in the present embodiment. The number of components can be reduced compared to a case where the plate supporters are provided at four locations. Further, the manufacturing cost for the plate transport device is reduced.

(5) Operation of Holding Plate Using Plate Transport Device

Figure 10:
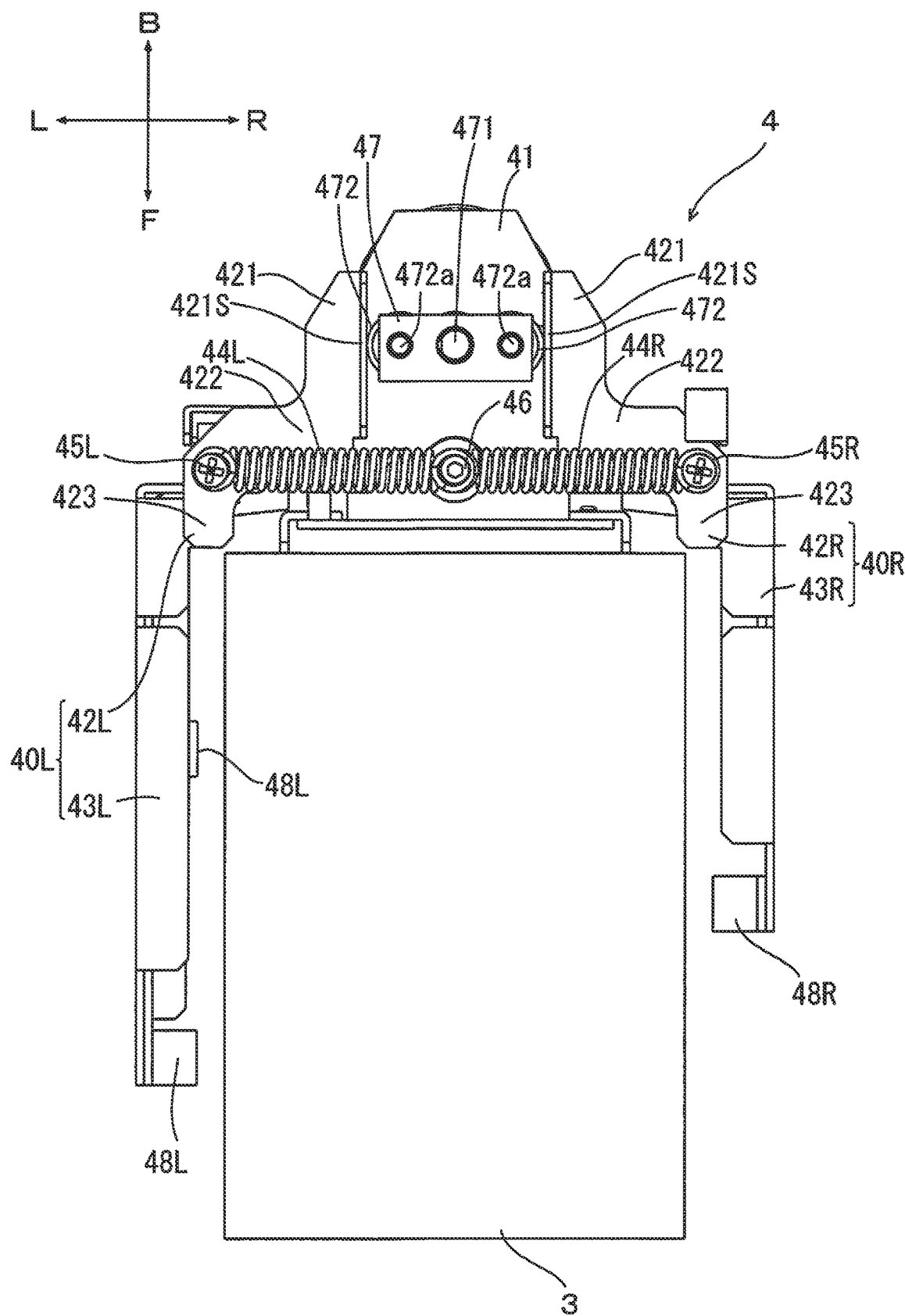
FIG. 10 is a diagram showing the left and right arm members of the plate transport device being open.

The operation of holding the plate 3 using the above-described plate transport device 4 will be described. FIG. 10 is a diagram showing the left and right arm members 43L, 43R of the plate transport device 4 being open (separated from the plate transport device 4). That is, FIG. 10 is a diagram showing the state of the plate transport device 4 before the plate transport device 4 holds the plate 3. Alternatively, FIG. 10 is a diagram showing the state of the plate transport device 4 after the plate transport device 4 has released the plate 3.

The rotation shaft 471 is driven in response to a control signal transmitted from the controller of the plate changer 2 (not shown), the rotation shaft 471 and the rotation plate 47 rotate together, and the rotation plate 47 is put in a state where its longitudinal direction is directed in the left-and-right direction as shown in FIG. 10.

When the rotation plate 47 rotates such that its longitudinal direction is directed in the left-and-right direction, the roll members 472, 472 provided in the lower portions at both ends of the rotation plate 47 move to increase the distance between the left and right sliding members 42L, 42R. Specifically, the roll member 472 that has moved in the leftward direction comes into contact with the stopper 421S of the left sliding member 42L and moves the sliding member 42L in the leftward direction. The roll member 472 that has moved in the rightward direction comes into contact with the stopper 421S of the right sliding member 42R and moves the sliding member 42R in the rightward direction. At this time, the roll member 472 comes into contact with the stoppers 421S, thereby pressing the left and right stoppers 421S in the left-and-right direction while being rotated passively.

Thus, the left sliding member 42L moves in the leftward direction against the biasing force of the spring 44L, and the left arm member 43L moves together with the left sliding member 42L in the leftward direction. Further, the right sliding member 42R moves in the rightward direction against the biasing force of the spring 44R, and the right arm member 43R moves together with the right sliding member 42R in the rightward direction. FIG. 10 shows the distance between the left and right arm members 43L, 43R being larger than the width of the plate 3 in the left-and-right direction.

As shown in FIG. 10, with the distance between the left and right arm members 43L, 43R being large, the plate transport device 4 starts an operation of preparing to hold the plate 3 housed in the plate storage 21 of the plate changer 2. Alternatively, as shown in FIG. 10, the distance between the left and right arm members 43L, 43R is increased, whereby the plate transport device 4 releases the plate 3 on the plate holder 11 of the autosampler 1.

Figure 11:
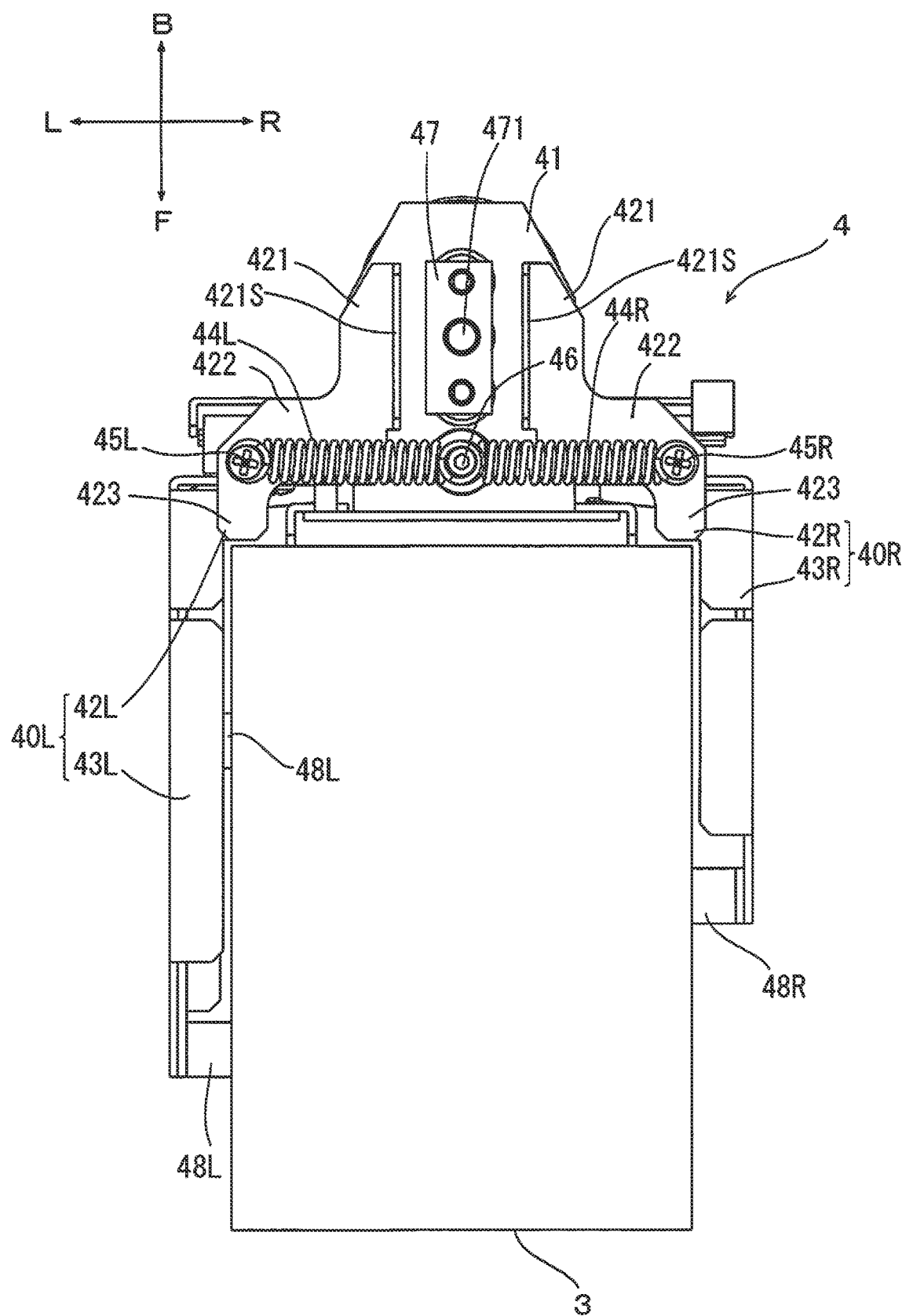
FIG. 11 is a diagram showing the left and right arm members of the plate transport device being closed.

FIG. 11 is a diagram showing the left and right arm members 43L, 43R of the plate transport device 4 being closed (being close to each other). That is, FIG. 11 is a diagram showing the plate transport device 4 holding the plate 3.

The rotation shaft 471 is driven in response to a control signal transmitted from the controller (not shown) of the plate changer 2, the rotation shaft 471 and the rotation plate 47 rotate together, and the rotation plate 47 is put in a state where its longitudinal direction is directed in the front-and-rear direction as shown in FIG. 11.

When the rotation plate 47 rotates such that its longitudinal direction is directed in the front-and-rear direction, the force increasing the distance between the left and right sliding members 42L, 42R by the roll members 472, 472 provided in the lower portions at both ends of the rotation plate 47 is released. Thus, the left sliding member 42L moves in the rightward direction by the biasing force of the spring 44L, and the left arm member 43L moves together with the left sliding member 42L in the rightward direction. The left arm member 43L moves in the rightward direction, so that the plate supporters 48L, 48L come into contact with the plate 3. Thus, movement of the left arm member 43L in the rightward direction is stopped.

Further, the right sliding member 42R moves in the leftward direction by the biasing force of the spring 44R, and the right arm member 43R moves together with the right sliding member 42R in the leftward direction. The right arm member 43R moves in the leftward direction, so that the plate supporter 48R comes into contact with the plate 3. Thus, movement of the right arm member 43R in the leftward direction is stopped. In FIG. 11, the width of the plate 3 in the left-and-right direction coincides with the distance between the left and right arm members 43L, 43R, and the left and right arm members 43L, 43R can hold the plate 3.

In this manner, the plate transport device 4 of the present embodiment utilizes the biasing forces of the springs 44L, 44R and holds the plate 3 between the left moving member 40L having the left sliding member 42L and the left arm member 43L, and the right moving member 40R having the right sliding member 42R and the right arm member 43R. Therefore, the plate transport device 4 can hold the plate 3 in movable ranges of the left and right moving members 40L, 40R. Thus, it is not necessary to use a dedicated plate as the plate 3 to be used by the plate transport device 4. Because the plate transport device 4 can hold a plate 3 having various shapes and sizes, different types of plates can also be used.

It is not necessary for the plate transport device 4 to have a projection (a projection for holding a plate) that coincides with a hole (a hole for holding a plate) provided in a dedicated plate as conventionally done. Because it is not necessary for the plate transport device 4 to have a projection, the manufacturing cost for the plate transport device 4 is reduced, and the accurate position adjustment is not necessary in a step of assembling the plate changer.

Further, the plate transport device 4 in the present embodiment rotates the rotation plate 47 and the roll member 472, thereby being able to start an operation of holding the plate 3. Further, the plate transport device 4 rotates the rotation plate 47 and the roll member 472, thereby being able to release the holding state of the plate 3.

(6) Transportation of Plate to Autosampler by Plate Transport Device

Figure 12:
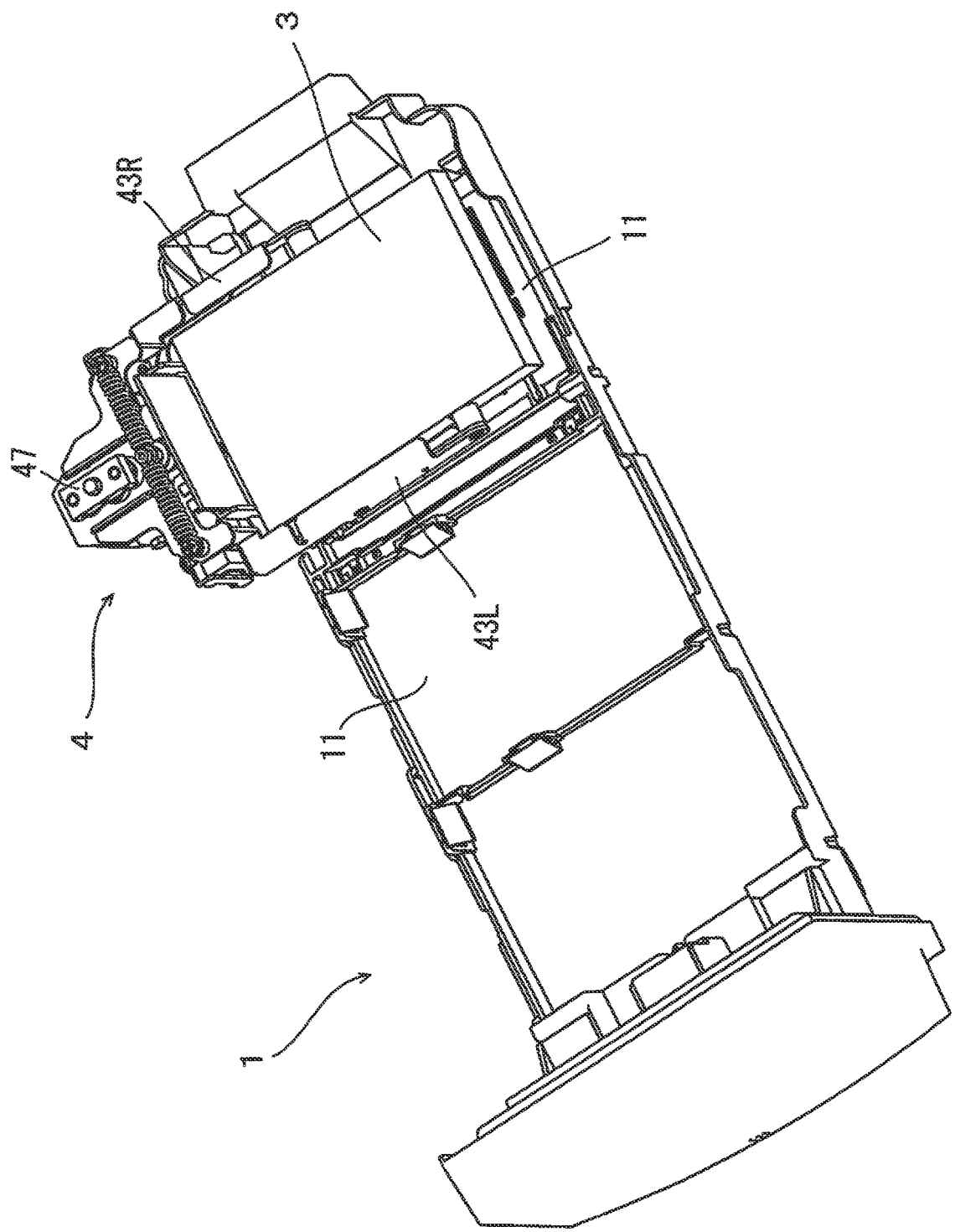
FIG. 12 is a perspective view showing the plate transport device that has moved to the autosampler while holding a plate.

FIG. 12 is a perspective view showing the plate transport device 4 that has moved into the autosampler 1 while holding the plate 3. FIG. 13 is a plan view showing the plate transport device 4 that has moved into the autosampler 1 while holding the plate 3. FIGS. 12 and 13 are showing the similar state of the plate transport device 4 as the plate transport device 4 shown in the schematic diagram in FIG. 3.

As shown in FIGS. 12 and 13, the plate transport device 4 is located above the plate holder 11 provided in the autosampler 1 while holding the plate 3. At this point in time, the rotation plate 47 is in a state where its longitudinal direction is directed in the front-and-rear direction of the plate transport device 4, and the plate 3 is being held by the left and right arm members 43L, 43R.

FIG. 14 is a cross sectional view taken along the line XIV-XIV shown in FIG. 13. As shown in FIG. 14, the plate transport device 4 holding the plate 3 is located slightly above the plate holder 11. Guides 12, 13 are provided at the plate holder 11. Both of the upper end portions of the guides 12, 13 are inclined surfaces that are inclined inwardly of the plate holder 11. Thus, even in a case where the position of the plate transport device 4 that is lowered from a position above the plate holder 11 is slightly shifted in the left-and-right direction of the plate transport device 4, since the plate transport device 4 is guided by the guides 12, 13, the plate 3 is placed at a correct position in the plate holder 11.

The plate transport device 4 of the present embodiment utilizes the biasing forces of the spring 44L and the spring 44R and supports the left moving member 40L having the left sliding member 42L and the left arm member 43L, and the right moving member 40R having the right sliding member 42R and the right arm member 43R. Thus, the left and right moving members 40L, 40R are movable in the left-and-right direction while holding the plate 3. In other words, when an external force is applied with the left and right arm members 43L, 43R holding the plate 3, the left and right arm members 43L, 43R are movable leftwardly and rightwardly and in parallel with each other while holding the plate 3.

With such a configuration, when the plate 3 is placed in the autosampler 1, in a case where the guides 12, 13 are provided at the autosampler 1, the plate 3 is placed on the plate holder 11 in the autosampler 1 while the holding position of the plate 3 in the left-and-right direction is adjusted. That is, even in a case where the position at which the plate 3 is lowered from above is slightly shifted from the position of the plate holder 11 in the left-and-right direction, the plate 3 being movable in the left-and-right direction is smoothly placed on the plate holder 11 while the plate transport device 4 is guided by the guides 12, 13.

In the above-mentioned embodiment, the linear guide 55 is utilized as a means for moving the left moving member 40L having the left sliding member 42L and the left arm member 43L, and the right moving member 40R having the right sliding member 42R and the right arm member 43R. However, the linear guide is merely one example as a means for movement, and another means for movement may be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

(7) Correspondences Between Constituent Elements in Claims and Parts in Preferred Embodiments In the following paragraphs, non-limiting examples of correspondences between various elements recited in the claims below and those described above with respect to various preferred embodiments of the present invention are explained. In the above-mentioned embodiment, the left-and-right direction (the direction of the arrow L-R) of the plate transport device 4 is an example of a first direction, the left moving member 40L having the left sliding member 42L and the left arm member 43L is an example of a first moving member, and the right moving member 40R having the right sliding member 42R and the right arm member 43R is an example of a second moving member.

Further, in the above-mentioned embodiment, the screw 46 is an example of an intermediate supporter, the screw 45L is an example of a first supporter, the spring 44L is an example of a first elastic member, the screw 45R is an example of a second supporter, and the spring 44R is an example of a second elastic member. Further, in the above-mentioned embodiment, the screw hole 411 and the screw 46 are examples of an adjustment mechanism, the rotation plate 47 and the roll member 472 are examples of a rotation member, and the rotation position of the rotation plate 47 shown in FIG. 10 is an example of a pressing position.

As each of constituent elements recited in the claims, various other elements having configurations or functions described in the claims can be also used.

(8) Other Embodiments

While the screws 46, 45L, 45R are used as the intermediate supporter, the first supporter and the second supporter in the above-mentioned embodiment, the present invention is not limited to this. For example, the intermediate supporter, the first supporter and the second supporter may be other holding members that can hold both ends of each of the springs 44L, 44R.

While the left and right arm members 43L, 43R extend in the direction substantially orthogonal to the left-and-right direction that is the first direction in the above-mentioned embodiment, the present invention is not limited to this. The left and right arm members 43L, 43R may extend in another direction intersecting with the first direction.

While being constituted by different members in the above-mentioned embodiment, the left and right sliding members 42L, 42R and the left and right arm members 43L, 43R may be integrally constituted. Further, the left and right sliding members 42L, 42R, the left and right arm members 43L, 43R and the connection plates 51L, 51R may be integrally constituted.

While the plate transport device 4 is used as a device that supplies a plate to the autosampler 1 for a high-performance liquid chromatograph by way of example in the above-mentioned embodiment, the plate transport device 4 of the present embodiment can be used as a device that supplies a plate to an autosampler 1 used for various analysis devices. Further, the autosampler according to the present invention is not limited to be used for a high-performance liquid chromatograph but can also be used for other analysis devices such as other types of liquid chromatographs.

The invention claimed is:

1. A plate transport device that supplies a sample plate to an autosampler and is used in a plate changer, comprising:
a main body having an intermediate supporter;
a first moving member that has a first supporter and is supported to be movable in a first direction with respect to the main body;
a second moving member having a second supporter and is supported to be movable in the first direction with respect to the main body;
a first elastic member that is attached between the intermediate supporter and the first supporter and supplies a first biasing force directed toward the intermediate supporter in the first direction to the first moving member; and
a second elastic member that is attached between the intermediate supporter and the second supporter and supplies a second biasing force, which is directed toward the intermediate supporter in the first direction and opposite to a direction in which the first biasing force is directed, to the second moving member, wherein
the sample plate is held between the first moving member and the second moving member by supply of a biasing force directed toward the second moving member to the first moving member by the first biasing force and supply of a biasing force directed toward the first moving member to the second moving member by the second biasing force, and
the intermediate supporter is provided between the first moving member and the second moving member, and
further comprising a rotation member that is supported at the main body to be rotatable, wherein
the rotation member is arranged between the first moving member and the second moving member in the first direction, and presses each of the first moving member and the second moving member in a direction away from the intermediate supporter when the rotation member rotates to be in a pressing position.

2. The plate transport device according to claim 1, wherein a position of the intermediate supporter is adjustable in the first direction.

3. The plate transport device according to claim 1, wherein
the first moving member includes a first arm member extending in a second direction that intersects with the first direction,
the second moving member includes a second arm member extending in a third direction that intersects with the first direction, and
first and second plate supporters that come into contact with the sample plate is provided at the first arm member to be spaced apart from each other in the second direction, and a third plate supporter that comes into contact with the sample plate is provided at the second arm member.

4. The plate transport device according to claim 3, wherein
each of the first, second and third plate supporters includes a hollow member extending in the first direction.

5. The plate transport device according to claim 3, wherein
a length of the first arm member in the second direction is larger than a length of the second arm member in the third direction.

6. A plate changer that is used for an autosampler, comprising:
a plate storage that stores one or more sample plates; and
the plate transport device according to claim 1 that transports a sample plate between the plate storage and the autosampler.

\* \* \* \* \*